United States Patent

[11] 3,596,099

| [72] | Inventor | Edward W. Thomas<br>Rockaway, N.J. |
|---|---|---|
| [21] | Appl. No | 734,426 |
| [22] | Filed | June 4, 1968 |
| [45] | Patented | July 27, 1971 |
| [73] | Assignee | Intertechnique S.A.<br>Plaisir, France |

[54] SELECTION OF SAMPLES, PARTICULARLY IN SCINTILLATION COUNTERS
8 Claims, 2 Drawing Figs.

| [52] | U.S. Cl. | 250/106,<br>250/71.5 |
|---|---|---|
| [51] | Int. Cl. | G01t 1/20 |
| [50] | Field of Search | 250/71.5,<br>106 SC |

[56] References Cited
UNITED STATES PATENTS

| 3,087,063 | 4/1963 | Gatzert | 250/106 SC |
|---|---|---|---|
| 3,246,156 | 4/1966 | Frank et al | 250/106 SC |
| 3,381,130 | 4/1968 | Nather | 250/71.5 |
| 3,390,269 | 6/1968 | Packard | 250/71.5 |

*Primary Examiner*—Archie R. Borchelt
*Attorney*—Lane, Aitken, Dunner & Ziems

ABSTRACT: A liquid scintillation spectrometer includes an endless conveyor having M successive compartments adapted to receive samples. A sample detector located at the working position is associated with a compartment counter and a counting logic so that a group of samples located in successive compartments is counted only if the first sample of the group is in a compartment numbered $x \cdot N+1$ (where $N=10$ for instance and $x$ is any whole number) and the preceding compartment $x \cdot N$ is empty. All sample groups which do not fulfill that condition are bypassed.

INVENTOR
EDWARD WHERRY THOMAS

BY Lane, Aitken, Dunner & Ziems.
ATTORNEY

SELECTION OF SAMPLES, PARTICULARLY IN SCINTILLATION COUNTERS

The invention relates to an automatic method and device for selecting groups of samples to be processed among those received in compartments of an endless conveyor; it finds an important application in liquid scintillation spectrometers.

For convenience to the user, liquid scintillation spectrometers must be so designed that a same sequence of measuring operations can be carried out automatically and in sequence on each sample-forming part of a predetermined group which occupies all of a plurality of compartments among those of an endless conveyor. For example, if the conveyor referred to is of the type described and claimed in French Pat. specification No. 1,524,258, it is desirable to ensure that a first sequence of measuring operations can be performed from a preselected compartment of the conveyor, that the same sequence is repeated automatically in the case of a complete group of samples up to the following empty compartment without requiring any further intervention on the part of an operator, and that all samples which do not belong to the selected group are bypassed.

The various solutions to this problem which have been proposed in the past have all had one objective in common: after initial startup, the motor of the conveyor is permitted to move the latter to a working station from which the sample contained in a preselected compartment can be transferred into a measuring chamber, to stop said conveyor in this position, to initiate the sequence of sample transfer and measuring operations, and to repeat the same operation on all samples contained in a plurality of compartments which follow the preselected compartment in the direction of progression of the conveyor.

Among other expedients, it is possible to make use of manually actuated switches placed on the control panel of the spectrometer in order to indicate the number of the compartment from which the sequence is to be initiated. However, this solution is cumbersome, lacks adaptability and is liable to give rise to errors. Recourse can also be had to the use of markers which differ from the samples in size and which can be inserted in the same compartments: upon arrival at the working location, a first marker actuates a switch, stops the conveyor and initiates the measuring sequence. The arrival at the work station of a second marker which is different from the first stops the sequence of operation so that the following samples are bypassed. This solution is also subject to disadvantages and the markers are additional elements which should be stored when not in use and are liable to be placed in the wrong order unless care exceeding conventional laboratory practice is exercised by the operator.

It is an object of the invention to provide a method and device for selecting groups of samples to be counted, which avoid the use of additional elements to be adjusted or positioned such as switches or markers.

For this purpose, the invention provides a method and device for selection of groups wherein the measuring sequence is initiated responsive to the successive presence in the direction of displacement of the conveyor of an empty compartment numbered $x \cdot N$ (N being a predetermined whole number and $x$ being any whole number) and of a compartment containing a sample on which the first measuring sequence is carried out and is repeated on the samples located in the following compartments until another empty compartment is moved to the working position.

The apparatus may be provided with manually actuated switches which permit to select either of several modes of operation, one of which corresponds to the above definition: for instance three modes of operation may be provided:

The group mode, in which selected groups of samples only are counted, while the other positions are ignored and bypassed;

The fully automatic mode, in which all samples are counted one or several times, while the empty compartments are bypassed;

The manual mode, in which only individually selected samples are examined.

The invention will be better understood from the following description of an embodiment which is given by way of nonlimitative example. The description refers to the accompanying drawings, wherein.

Figure 1:
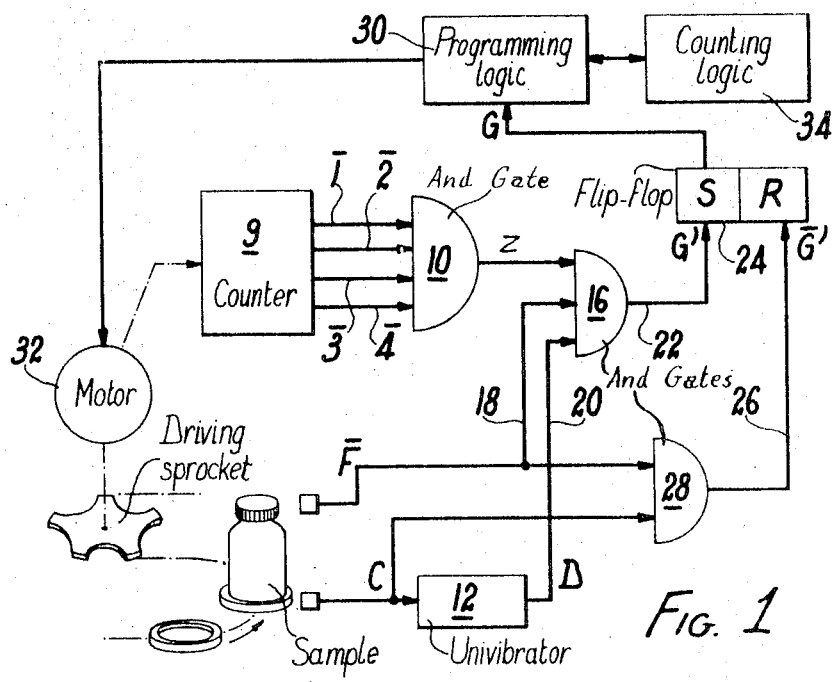
FIG. 1 is a block diagram showing a logic circuit for carrying out the invention and the mechanical portions of a sample conveyor which are directly associated with the circuit.
Figure 2:
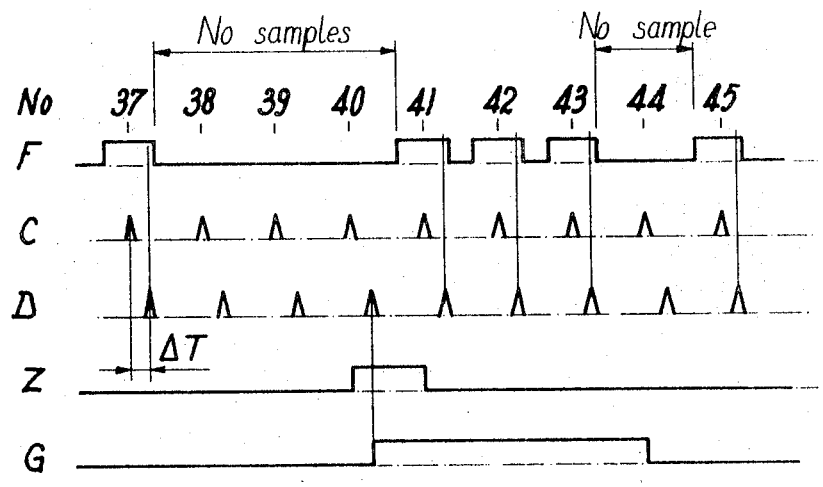
FIG. 2 is a diagram illustrating the sequence of operations in time when using the circuit of FIG. 1.

Before the embodiment illustrated in FIGS. 1 and 2 is described, a broad explanation based on the logical equations of operation to be fulfilled will now be given for greater clarity. It will be assumed that the general aim to be achieved is to initiate the sequence of operations on any one sample which is in any of the compartments numbered 10 $x+1$ (wherein $x$ designates any whole number such that 10 $x+1$ does not exceed the number M of compartments of the conveyor); in this particular instance, the number N mentioned above is equal to 10, and the compartments selected for possible beginning of a group are 1, 11, 21, ... up to 191 if 200 compartments are formed in the conveyor.

In general, $N=10$ represents the most convenient choice for an operator who is accustomed to pure decimal notation alone, since it makes it possible to assign to each compartment of the conveyor a digit in the decimal number system, such digit being represented in the logic circuits in binary-coded decimal notation.

Under these conditions, the notations will be as follows:

1, 2, 4 and 8 designate the four binary digits representing the least significant decimal digit of the number assigned to a compartment and available from a conventional counter: these four binary digits will be simultaneously zero in the case of the compartments numbered 10, 20, ... 190 and more generally in the case of each compartment numbered 10 $x$;

F designates a binary quantity which assumes the value 1 when a sample is present in the compartment located at the work station and which assumes the value 0 in the contrary case;

C designates a binary quantity which assumes the value 1 each time a compartment is exactly centered on the working station and which assumes the value 0 for the remainder of the time;

D designates a binary quantity which is delayed by a short interval $\Delta T$ with respect to the binary quantity C. The value 1 of quantity D will be represented by emission of a pulse and the value 0 by no signal (for the remainder of the time);

Z designates a binary quantity which assumes the value 1 when the decimal digit of minimum weight of the reference number of a compartment located at the working station is zero: the binary quantity Z assumes the value 1 when the binary digits 1, 2, 4 and 8 are all zero, that is to say when one compartment having the order 10, 20, ... 10 $x$, is located at the working station. In other words, Z is given by the logical equation:

$Z = \bar{1} \cdot \bar{2} \cdot \bar{4} \cdot \bar{8}$    (1) where $\bar{1}$ is NON 1, $\bar{2}$ is NON 2, etc...;

G designates a binary quantity which assumes the value 1 during emission of a signal which initiates the transfer of a sample from the working station to the radioactivity-measuring chamber, the measuring sequence and the return of the sample to the conveyor, followed by the repetition of these movements until G reassumes the value 0.

Once these notations have been adopted, one may write the logical equation which represents the first condition to be satisfied: a control signal which changes G from the value 0 to the value 1 must be emitted when the displacement of the conveyor has resulted in (a) the transfer of a vacant compartment having the order 10 $x$ to the working station and (b) the transfer of the following compartment 10 $x$+1 which contains a sample. The first condition may be written:

$$G'=Z \cdot D \cdot \overline{F} \quad (2)$$

Equation (2) may be interpreted as follows: When $Z$ is equal to 1 (that is to say, when a compartment numbered 10 $x$ is detected at the working station or slightly beyond said station), D becomes equal to 1 (namely when said compartment has passed slightly beyond the working station) and $F$ is zero (no sample is present in the compartment 10 $x$), a control signal appears ($G'$=1, corresponding to the transition of $G$ from 0 to 1). This signal remains present while the following samples are moved to the counting station unless and until condition (b) is not fulfilled. In other words, the control signal must disappear ($G$ changes over from 1 to 0) as soon as an empty compartment appears at the working station: in other words:

$$\overline{G'}=C \cdot F \quad (3)$$

This logical equation represents the transition of $G'$ from 1 to 0 and the return of $G$ to the value 0 when no sample is present in the compartment which has just come to the working station.

The logic circuit of FIG. 1 is one of many circuits adapted to satisfy equations (1), (2) and (3). This circuit comprises an AND circuit or logical gate 10 having four inputs for receiving signals which represent 1,2,4 and 8 and which are delivered by a compartment counter 9.

The binary quantity $\overline{F}$ is provided, for example, by a microswitch actuated by the sample or by a photoelectric cell controlled by a light beam which is intercepted by a sample when the latter is present at the working station.

The quantity C can also be provided by a microswitch which delivers a pulse when it is closed by each compartment as the latter reaches the working station.

The quantity $D$ is obtained on the output of a univibrator 12 having a time constant $\Delta T$ and set by a pulse which is representative of the transition of $C$ from 0 to 1.

The quantity $Z$ which appears at the output of the AND gate 10 is applied to the input 14 of a logical gate 16. The second input 18 of gate 16 receives the signal which represents $\overline{F}$ and the third input 20 is connected to the output of the univibrator 12.

In consequence, the gate 16 delivers a signal representing the quantity $\overline{G'}$ as defined by equation (2): this signal is applied to the "set" input 22 of a flip-flop 24 which delivers an output current representing $G$=1 when set by the signal $G'$ until a "reset" pulse $G'$ is applied to the other input 26 of said flip-flop.

The signal representing $G$ is applied (either directly or through other logic circuits in the event that it may be required to cancel the action of said signal for the purpose of manual or automatic operation as defined above) to a programming logic 30 which controls the conveyor drive motor 32, the sample transfer mechanism (not shown) and the counting logic 34. The sample transfer mechanism may be of the type disclosed and claimed in patent application Ser. No. 716,213, filed Mar. 26, 1968, assigned to the assignee of the present invention. The counting logic is of a type which is now in current use in liquid scintillation spectrometers and determines one or more counting operations on each sample. A pulse is delivered by the logic 34 upon termination of the counting.

As long as the programming logic 30 receives a signal $G$ from flip-flop 24, it stops motor 32 at the time a compartment comes to the working position, actuates the transfer mechanism, triggers the logic 34 for causing the counting operations to take place, and upon receipt of a "counting termination" signal from logic 34 controls return of the sample to the conveyor by the transfer mechanism (not shown) and resumes actuation of the conveyor by motor 32.

The flip-flop 24 is reset to a condition in which no signal $G$ is present when its second input receives signal $\overline{G'}$. This signal $\overline{G'}$ is delivered by a second AND gate 28 whose two inputs receive signals representative of $F$ and $C$, respectively: the output signal $\overline{G'}$ is applied to the "reset" input 26 of the flip-flop 16 and restores it to position 0 when an empty compartment comes to the working position. Two possibilities then exist:

a. If (i) that empty compartment is numbered 10 $x$ and if (ii) the next compartment contains a sample, the empty position is bypassed but the flip-flop is set again when the next compartment arrives to the working position.

b. If either of the two conditions (i) and (ii) is not fulfilled then the programming logic causes the motor 32 to drive the conveyor until another selected group arrives to the working position.

By way of example, FIG. 2 shows the operation of the device when the compartments 37, 41, 42, 43 and 45 contain samples. The horizontal dash-dot line indicates the value 0 of each logical quantity whilst the square waves or the peaks indicate the transition to the value 1. The quantity $F$ assumes the value 1 when a compartment contains a sample at the working location or close to it; the quantities $C$ and $D$ assume the value 1 for a short period of time, (in the case of $c$ each time a compartment is exactly at the work station and in the case of of $D$ with a time-lag $\Delta T$; $Z$ assumes the value 1 from the time a compartment numbered 10 $x$ comes to the working position and retains this value until the next compartment numbered 10 $x$+1 approaches the working position so that coincidence with the signal $D$ is possible. It is apparent that $G$ will assume the value 1 when $F$, $Z$ and $D$ are simultaneously equal to 1 or, in other words, when the empty compartment bearing the number 40 has just passed in front of the working location and the occupied compartment bearing number 41 approaches said location. Accordingly the measuring sequence is applied to the samples of all successive occupied compartments bearing the number 41, 41 and 43.

When the empty compartment 44 comes to the working location, $F$ becomes zero, $\overline{F}$ becomes equal to 1 and the coincidence of $F$=0 and $C$=1 results in the emission of signal $\overline{G'}$ by gate 28, resetting of the flip-flop 24, interruption of the repetition of the measuring sequence and resumption of forward motion of the conveyor up to the following group; the sample which is present in compartment 45 is omitted since it does not form part of a selected group.

It is important to note that the time delay $\Delta T$ must be sufficient to ensure that $C$ has reassumed the value 0 when $D$ assumes the value of 1; thus, if the signal $\overline{G'}=C \cdot F$ has been emitted in order to stop repetition as a result of detection of an empty compartment, the signal $G'=Z \cdot \overline{F} \cdot D \cdot$ may be emitted subsequently and may restart the procedure if said vacant compartment is numbered 10 $x$ and is followed by an occupied compartment, as indicated above.

For more clarity the nonessential or conventional parts have not been shown in FIG. 1: The actual circuits should for instance include inhibitor means active during the measuring sequences for preventing the circuit from resetting the flip-flop upon down movement of the sample from the conveyor to the counting chamber.

The advantages of the invention clearly appear from the foregoing and will only be summarized: flexibility in use and convenience are outstanding, since only one manual operation is involved in eliminating a group and this consists in placing a sample (usually an empty bottle) in the compartment which immediately precedes the group. This is of particular advantage when the apparatus provided with the group selecting device is pooled between several research departments. In that case one or more series of locations each beginning with a compartment numbered 10 $x$ are assigned to each department: the samples of a same batch are located in successive compartments, beginning with a compartment numbered 10 $x$+1 and all what is necessary for bypassing that batch is to locate an empty bottle in front of the group; removing the bottle and if felt it convenient storing it in an empty compartment between successive groups results in counting of the batch when it comes to the working station.

In most cases different counting programs are to be carried out on the different series belonging to different departments: for automatic switchover from one program to another when passing from one group to the next, the device according to the invention may be associated with the program selection arrangement described in French Pat. application Ser. No. PV 129,686 filed Nov. 24, 1967 in the name of the assignee of the present invention. The plug used for program selection may then be located in any compartment preceding the group and even in the compartment numbered $10 \cdot x$ if it is so designed as to avoid the sample sensor confusing it with a sample.

It will also be understood by those skilled in the art that the compartment numbers which are stored in the counter need not be identical to those affixed to the compartments: A rest pushbutton may be provided for enabling any sample to be numbered 1 in the counter with all others following in sequence. Alternately, the numbers in the counters may be offset from those affixed to the compartments so that for instance initiation may take place responsive to successive occurrence of an empty position in a location numbered $10\,x-1$ and of a sample in a position $10\,x$.

A large number of alternatives may evidently be contemplated: for example, it would be possible to design the device for starting up from any empty position which is a multiple of 8; in that case, a reference number in octal notation should preferably be assigned to the compartments.

In short the scope of the invention is not limited to the particular embodiments described above, and many modifications thereof may be derived by those skilled in the art, which remain within the spirit of the invention.

I claim:

1. A process for selecting a predetermined group of samples located in successive compartments of an endless conveyor having M compartments numbered 1 to M and adapted to move each of said compartments in seriatim order to a working position and for causing a same predetermined measuring process to be carried out on each sample of said group, said process comprising:
    a. automatically detecting the successive occurrence at said working position of an empty compartment numbered $x \cdot N$, where N is a preselected whole number and $x$ is any whole number which fulfills the condition $x \cdot N \leq M$, and of a compartment $x \cdot N+1$ provided with a sample,
    b. stopping said conveyor with said compartment numbered $x \cdot N+1$ at said working position and initiating said measuring process on the sample in said compartment,
    c. starting again said conveyor responsive to termination of the measuring process,
    d. repeating steps (b) and (c) on each sample located in the compartments following as long as no empty compartment is moved to the working position,
    e. stopping said process responsive to coming of an empty compartment to said working position,
    f. and omitting said measuring process on any samples which are not in a group located in successive compartments starting with a compartment numbered $x \cdot N+1$ immediately following an empty compartment numbered $x \cdot N$.

2. A process according to claim 1, wherein $N=10$ and the compartments are numbered in decimal notation.

3. In an automatic apparatus for measuring a plurality of samples in seriatim order:
    a working position,
    an endless conveyor having compartments adapted to receive samples and moving them along a closed path to said working position,
    motor means for driving said conveyor,
    a programming and measuring logic adapted when activated to stop said motor upon arrival of a sample to said working position and to measure said sample, to restart the motor upon completion of the measure and to repeat the same sequence on the following samples,
    and means responsive to the successive passages (1) of an empty compartment numbered $X \cdot N$ at the working position and (2) of a sample in the next compartment $N \cdot x+1$ for activating said programming and counting logic upon arrival of said compartment numbered $N \cdot x+1$ at the working position, wherein N is a predetermined whole number and $x$ is any whole number.

4. In an automatic apparatus for counting a plurality of radioactive samples in seriatium order:
    a working position,
    an endless conveyor having M compartments adapted to receive samples and moving them along a closed path to said working position,
    motor means for driving said conveyor,
    a programming and counting logic adapted when activated to stop said motor upon arrival of a sample to said working position, to count said sample, to restart the motor upon completion of the counting and to repeat the same sequence on the following samples,
    a counter adapted to provide a signal responsive to the presence of a compartment numbered $x \cdot N$ in proximity of the working position, N being a predetermined whole number and $x$ any whole number,
    compartment sensing means for providing a first pulse responsive to arrival of a compartment to said working position,
    sample sensing means for providing a second pulse responsive to the absence of a sample in said compartment located at said working position,
    and means responsive to simultaneous occurrence of said signal,
    a pulse delayed by a short time interval with respect to said first pulse,
    and said second pulse, for activating said programming and counting logic.

5. An automatic apparatus according to claim 4, comprising means responsive to simultaneous occurrence of said first and second pulses for deactivating said programming and counting logic.

6. An automatic apparatus according to claim 4, comprising:
    an AND gate having three inputs,
    mean for applying said signal, said delayed pulse and said second pulse to said inputs,
    and a flip-flop adapted to energize said logic when in set condition and having its "set" input connected to said output.

7. An automatic apparatus according to claim 6 comprising:
    a second AND gate having two inputs,
    means for applying said first and second pulses to respective ones of said two inputs,
    and means for applying the output of said second AND gate to the "reset" input of said flip-flop.

8. An automatic apparatus according to claim 4, wherein said means for delaying said first pulse is a univibrator.

UNITED STATES PATENT OFFICE
CERTIFICATE OF CORRECTION

Patent No. 3,596,099  Dated July 27, 1971

Inventor(s) Edward W. Thomas

It is certified that error appears in the above-identified patent and that said Letters Patent are hereby corrected as shown below:

Column 3, line 45, "$\overline{G}'$" should be --$G'$--.

Column 3, line 48, "$G'$" should be --$\overline{G}'$--.

Column 3, line 68, "he" should be --the--.

Column 4, line 1, "F" should be --$\overline{F}$--.

Column 4, line 22, "c" should be --C--.

Column 5, line 14, "rest" should be --reset--.

Column 6, claim 3, line 10, "$X \cdot N$" should be --$x \cdot N$--.

Signed and sealed this 1st day of October 1974.

(SEAL)
Attest:

McCOY M. GIBSON JR.
Attesting Officer

C. MARSHALL DANN
Commissioner of Patents